United States Patent [19]

Kotegawa et al.

[11] Patent Number: 4,736,834
[45] Date of Patent: Apr. 12, 1988

[54] ACCELERATION ACCUMULATING CHAIN CONVEYOR

[75] Inventors: Katsumi Kotegawa, Katano; Makoto Kanehira, Hirakata; Tomomi Hirata, Kadoma; Shinichi Hayashi, Osaka; Tetsuya Murano, Sakai, all of Japan

[73] Assignee: Tsubakimoto Chain Co., Japan

[21] Appl. No.: 846,863

[22] Filed: Apr. 1, 1986

[30] Foreign Application Priority Data

Apr. 3, 1985 [JP] Japan .................................. 60-48656

[51] Int. Cl.[4] .............................................. B65G 17/24
[52] U.S. Cl. ...................................................... 198/779
[58] Field of Search .......................................... 198/779

[56] References Cited

U.S. PATENT DOCUMENTS 3,631,967  1/1972  Converse, III et al. ............ 198/779
4,339,030  7/1982  Hirata .................................. 198/779

FOREIGN PATENT DOCUMENTS 0478041  10/1969  Switzerland ........................ 198/779
0870265  10/1981  U.S.S.R. ............................. 198/779

Primary Examiner—Stephen J. Novosad
Assistant Examiner—William P. Neuder
Attorney, Agent, or Firm—Steele, Gould & Fried

[57] ABSTRACT

An acceleration accumulation chain conveyor, having a link/pin chain for driving rollers along rails, the conveyor comprising: support rollers rotatably loosely fitted over the pins, each support roller having a larger diameter portion with a rim for engaging conveyed articles and side faces, and annular bosses of smaller diameter projecting axially from the side faces, the bosses having inner peripheral surfaces for frictionally engaging the pins and outer peripheral surfaces; and, chain rollers rotatably loosely fitted on the bosses, the chain rollers having inner peripheral surfaces for frictionally engaging the outer peripheral surfaces of the bosses, outer peripheral surfaces for engaging the rails and side faces for frictionally engaging the side faces of the support rollers, one of the inner and outer peripheral surfaces of the chain rollers being tapered to direct a component of force urging the chain rollers inwardly to enable frictional engagement between the respective side faces and the outer peripheral surfaces of the bosses being shaped to conform to the inner peripheral surfaces of the chain rollers, whereby the frictional engagement between the chain and support rollers is substantially increased.

18 Claims, 1 Drawing Sheet

ACCELERATION ACCUMULATING CHAIN CONVEYOR

BACKGROUND OF THE INVENTION

1. Field of the Invention

This invention relates to acceleration accumulating chain conveyors used in assembly lines or the like, and more particularly, to an acceleration accumulating chain conveyor which accelerates articles to be conveyed more quickly from stopped positions, to shorten the conveying time.

2. Prior Art

Assembly lines are required to suppress noises caused by the travelling conveyor chains to the lowest levels possible. The only method known, until recently, to lower the noise was to run the chain more slowly. Unfortunately, the conveying speed of articles to be conveyed also becomes slower so that the efficiency of production is degraded. Further, when the articles to be conveyed are temporarily accumulated on the conveyor of the assembly line, the chain keeps travelling beneath the articles, which slide undesirably relative to the chain, often damaging the articles, the conveyor, or both. An acceleration accumulating chain conveyor which overcomes these problems is disclosed in U.S. Pat. No. 4,339,030, the teachings of which are fully incorporated herein by reference. As shown in FIG. 4 herein, a large diameter support roller is loosely fitted onto a conventional chain roller and the articles to be conveyed are mounted on the support roller. The rotation of the chain roller due to the travelling of the chain is transmitted to the support roller by the rotary frictional force between the chain roller and the support roller, so that the conveying speed of the articles becomes the chain speed plus the speed corresponding to the ratio of the radius of the support roller to the radius of the chain roller. Thus the articles are conveyed at a speed which is faster than the chain speed and, when the articles are accumulated during conveying, the conveying roller overcomes the rotary frictional force effecting engagement with the chain roller, and rotates backwards, in spite of the travelling of the chain and without any sliding of the article on or relative to the chain.

In such conveyors, when accumulated articles are released, the backwardly rotating support roller is again rotated forwardly by the rotary frictional force. The articles to be conveyed begin moving on the conveying rollers and eventually reach or reattain the regular conveying speed, which is faster than the chain speed. However, the frictional force between the support roller and chain roller is produced only because the inner peripheral surface of the cylindrical support roller and the outer peripheral surface of the cylindrical chain roller are urged and abut against each other. The rotary frictional force is thus so small that a significant time lag occurs between the release and subsequent attainment of the regular conveying speed of the articles. As the regular conveying speed of the articles cannot be attained at the same time as, or even soon after the articles are released, accumulation inevitably results in time delays, which slow conveying time, which in turn delay the entire production line. Even small delays have a substantial cumulative effect on production efficiency Accordingly, the solution of U.S. Pat. No. 4,339,030 itself presented a new problem.

This invention solves the new problem by increasing the rotary fictional force between the support rollers and the chain rollers, without hindering the reverse rotation of the support rollers, which enables accumulation of articles without damage from sliding engagement.

SUMMARY OF THE INVENTION

It is an object of the invention to provide an acceleration accumulating chain conveyor which so accelerates articles to be conveyed when they are released for movement that the regular conveying speed of the articles is attained virtually as soon as the articles are released from accumulation. Conveying times are thereby significantly reduced, and production line efficiency is thereby significantly increased.

This and other objects of the invention are accomplished by an acceleration accumulation chain conveyor, having a chain with pin means for driving rollers along rails, the conveyor comprising: support rollers rotatably loosely fitted over the pin means, each support roller having a larger diameter portion with a rim for engaging conveyed articles and side faces, and annular bosses of smaller diameter projecting axially from the side faces, the bosses having inner peripheral surfaces for frictionally engaging the pin means and outer peripheral surfaces; and, chain rollers rotatably loosely fitted on the bosses, the chain rollers having inner peripheral surfaces for frictionally engaging the outer peripheral surfaces of the bosses, outer peripheral surfaces for engaging the rails and side faces for frictionally engaging the side faces of the support rollers, one of the inner and outer peripheral surfaces of the chain rollers being tapered to direct a component of force urging the chain rollers inwardly to enable frictional engagement between the respective side faces and the outer peripheral surfaces of the bosses being shaped to conform to the inner peripheral surfaces of the chain rollers, whereby the frictional engagement between the chain and support rollers is substantially increased.

This and other objects of the invention are also accomplished by improved roller sets for acceleration accumulation chain conveyors, such conveyors having rollers driven along rails by chains having pin means on which the rollers are mounted, each roller set comprising: a support roller rotatably loosely fitted over the pin means, the support roller having a larger diameter portion, with a rim for carrying conveyed articles, and side faces; annular bosses of smaller diameter projecting axially from the side faces, the bosses having inner peripheral surfaces for frictionally engaging the pin means and outer peripheral surfaces; a chain roller rotatably loosely fitted on each of the bosses, the chain rollers having inner peripheral surfaces for frictionally engaging the outer peripheral surfaces of the bosses, outer peripheral surfaces for engaging the rails and side faces for frictionally engaging the side faces of the support roller; one of the inner and outer peripheral surfaces of each chain roller being tapered to direct a component of force urging the chain rollers inwardly to enable frictional engagement between the respective side faces; and, the outer peripheral surface of each boss being shaped to conform to the inner peripheral surface of the chain rollers, whereby the frictional engagement between the chain and support rollers is substantially increased.

BRIEF DESCRIPTION OF THE DRAWINGS

This and other objects, features and advantages of the invention will become apparent from the following description, taken in conjunction with the accompanying drawings, wherein.

DETAILED DESCRIPTION OF THE PREFERRED EMBODIMENTS

Figure 1:
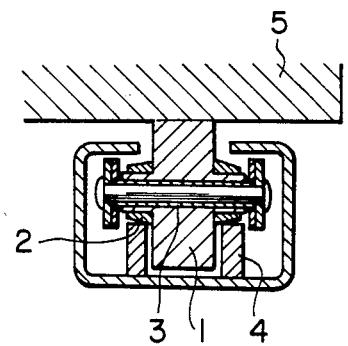
FIG. 1 is a sectional view through an acceleration accumulating chain conveyor showing a first embodiment of this invention.

When the articles to be conveyed are moved, for example, when released from accumulation, the time lag generated between the release and attainment of the regular conveying speed of the articles, is related to the rotary frictional force between the support roller and the chain roller. The larger the rotary frictional force, the shorter the time lag; and, the smaller the rotary frictional force, the longer the time lag. The rotary frictional force is increased by this invention, by providing the support roller with smaller diameter boss portions projecting axially from side faces thereof, left and right, and a chain roller having its inner or outer peripheral surface formed as a tapered surface, rotatably loosely fitted onto the boss portion, with the larger diameter end face being directed toward the center of the chain. Such tapered surfaces define positions where rotary frictional force is generated between the support roller and the chain roller at two portions of the larger diameter end face of the chain roller and the large diameter side face of the support roller, in addition to the rotary frictional force generated between the outer peripheral surface of the boss portion of the support roller and the inner peripheral surface of the chain roller, to increase the rotary frictional force.

The chain is trained over a rail by means of the chain rollers. Support rollers overfit the chain rollers and articles to be conveyed are mounted on the support roller. The weight of the articles, when otherwise free to move, can be thought of as "activating" the rotary frictional force. Since the chain roller is formed, on the outer or inner peripheral surface thereof, with a tapered surface to direct a component of force toward the center of the chain as the chain travels, the chain roller tends to move inwardly of the chain and rotate with the larger diameter end face being urged against and abutting the larger diameter side face of the support roller. The rotary frictional force between the support roller and the chain roller in this case has a first component generated between the outer peripheral surface of boss portion of the support roller and the inner peripheral surface of the chain roller and a second component generated between the larger diameter side face of the support roller and the larger diameter end face of the chain roller to provide a larger total or composite rotary frictional force than has heretofore been possible. As a result, the articles to be conveyed are accelerated with the large force, upon "activation," to attain the regular conveying speed at very nearly the same time as the accumulation terminates and the articles are released, for example, thereby shortening the time needed for the conveying step.

When articles are accumulated, the support rollers interengages with the chain roller only by the rotary frictional force acting between the chain roller and the support roller. During accumulation, the support roller overcomes this rotary frictional force and rotates backwardly to prevent sliding between the articles and the support roller in spite of the travelling of the chain and the larger total frictional force. Moreover, the articles to be conveyed reach a speed determined by the chain speed added to the speed corresponding to the ratio of the radius of the chain roller (as measured at the point(s) where the chain roller contacts the inner corner edge of the rail during conveying) to the radius of the large diameter portion of the support roller. The articles can therefore be conveyed at a speed faster than the chain speed. Various embodiments of the invention are shown in FIGS. 1–3, each illustrating the use of tapered surfaces to increase the rotary frictional force.

Referring to FIG. 1, a support roller 1, like a plurality of such support rollers, is provided with a large diameter portion and with cylindrical bosses of relatively smaller outer diameter projecting axially (left and right) from both sides. Each support roller is rotatable, loosely fitted onto a bushing 3 of a pin/link driving chain. A chain roller 2 is formed with an outer peripheral tapered surface and a cylindrical inner peripheral surface, having a diameter smaller than the diameter of the large diameter portion of the support roller 1. Each chain roller 2 is rotatably, loosely fitted onto the boss of a support roller 1 and mounted on a rail 4, with the end face of larger diameter being directed inwardly, toward the center of the chain. The angular inclination of the radially outer surface relative to the top of the track 4, results in the chain rollers being urged inwardly during rotation, pressing the support roller therebetween and thereby generating a significantly greater frictional driving force to rapidly accelerate the support roller.

Figure 2:
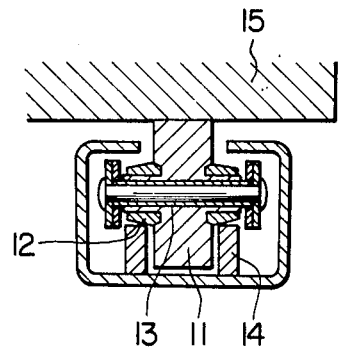
FIG. 2 is a sectional view showing a second embodiment of this invention.

FIG. 2 shows another embodiment of this invention. The large diameter portion of support roller 11 has grooves formed in each side face thereof, for receiving a projecting portion of a chain roller 12. The diameter end face of each chain roller 12, otherwise formed as in the first embodiment has an outer portion cut away to form a projecting portion with an inclined surface. The projecting portion is received in the groove of the support roller 11. During rotation, the larger diameter cut-away end face of the chain roller 12 is urged toward the center of the chain. Frictional engagement of the projecting portions in the grooves provides the larger rotary frictional force over and above that due to the angular relationship of the chain roller and the rail.

Figure 3:
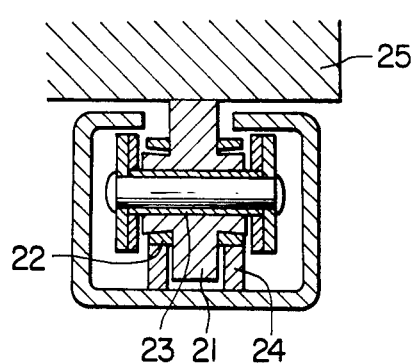
FIG. 3 is a sectional view showing a third embodiment of this invention.
Figure 4:
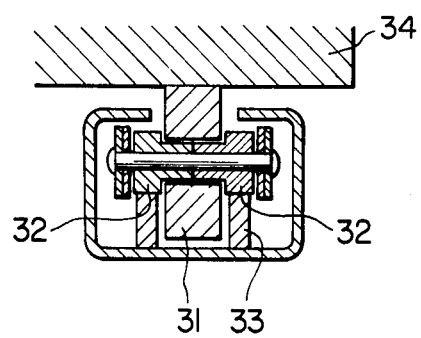
FIG. 4 is a sectional view showing a prior embodiment, substantially in accordance with U.S. Pat. No. 4,339,030.

FIG. 3 shows yet another embodiment of the invention. The outer peripheral surfaces of the bosses projecting axially (left and right) from the support roller 21 are formed with tapered surfaces diverging toward both left and right ends of the suport roller 21. The chain roller 22 has a cylindrical outer peripheral surface and a tapered inner peripheral surface. The inner surface is tapered so as to define a bore having a smaller inner diameter than outer diameter. The bosses of the support rollers have corresponding tapers, enabling interfitting of the rollers. The chain roller 22, by reason of the tapered shape of the inner peripheral surface, is loosely fitted onto the outer peripheral tapered surface of the boss of the support roller 21. The clearance is slightly larger than that of the chain rollers 2, 12 in the first and second embodiments. While the rotary frictional force between the chain roller 22 and support roller 21 is in the same relationship as that in the first embodiment, since the outer peripheral surface of the chain roller 22 is cylindrical, the chain roller can be supported on the rail 24 with good stability and the wear of the chain roller 22 and rail 24 is small.

Articles moved on acceleration accumulating chain conveyors, according to this invention, attain high speeds several times the chain speed, although the chain speed is slow, and noises generated by the chain are low. Since the conveying roller is also rotated backwardly during the accumulation of articles, sliding between the articles and support roller is effectively avoided. Moreover, the rotary frictional force between the support roller and the chain roller can be simply and conveniently adjusted by changing the taper angle, so that the chain roller does not have to be formed with an outer or inner peripheral tapered surface when only small frictional force is needed. A further significant and unique effect is that, since the rotary frictional force between the support roller and chain roller becomes extremely large, the articles to be conveyed are accelerated with an extremely large force when they are activated or released, and attain the regular conveying speed at virtually the same time as they are released from the accumulation, so that time taken for conveying is reduced to substantially improve the overall efficiency of production.

The invention may be embodied in other specific forms without departing from the spirit or essential attributes thereof. Accordingly, reference should be made to the appended claims rather than the foregoing specification, to determine the true scope of the invention.

What is claimed is:

1. An acceleration accumulation chain conveyor, having a chain with pin means for driving rollers along rails, the conveyor comprising:
    support rollers rotatably loosely fitted over the pin means, each support roller having a larger diameter portion with a rim for engaging conveyed articles, having side faces and having annular bosses of smaller diameter projecting axially beyond the side faces, the bosses having inner peripheral surfaces for frictionally engaging the pin means and having outer peripheral surfaces; and,
    chain rollers rotatably loosely fitted on the bosses, the chain rollers having inner peripheral surfaces for frictionally engaging the outer peripheral surfaces of the bosses, outer peripheral surfaces for engaging the rails and having side faces for frictionally engaging the side faces of the support rollers, one of the inner and outer peripheral surfaces of the chain rollers being tapered to direct a component of force urging the chain rollers inwardly to enable frictional engagement between the respective side faces of the support rollers and the chain rollers, and the outer peripheral surfaces of bosses being shaped to conform to the inner peripheral surfaces of the chain rollers, whereby the frictional engagement between the chain rollers and the support rollers is substantially increased.

2. An acceleration accumulation chain conveyor according to claim 1, wherein:
    the bosses of the support rollers are substantially cylindrical;
    the chain rollers are of conical form, the outer peripheral surfaces being tapered and the inner peripheral surfaces being substantially cylindrical, thereby defining annular end faces of larger and smaller diameter relative to one another; and,
    the larger diameter annular end faces being positioned for frictional engagement with the side faces of the support rollers.

3. An acceleration accumulation chain conveyor according to claim 2, wherein the support rollers comprise annular grooves in the side faces for receiving the larger diameter annular end faces of the chain rollers, thereby enabling additional frictional engagement between portions of the outer peripheral surface of the chain rollers and the support roller.

4. An acceleration accumulation chain conveyor according to claim 1, wherein the support rollers comprise annular grooves for receiving the side faces of the chain rollers, as well as portions of the outer peripheral surfaces of the chain rollers.

5. An acceleration accumulation chain conveyor according to claim 1, wherein the inner peripheral surfaces of the support rollers and the outer peripheral surfaces of the chain rollers are substantially cylindrical.

6. An accumulation chain conveyor according to claim 5, wherein each of the chain rollers has a conically shaped bore defining opposite annular end faces of different thickness relative to one another, the chain rollers being so disposed that the larger thickness end faces are positioned for frictional engagement with the side faces of the support rollers.

7. Improved roller sets for acceleration accumulation chain conveyors, such conveyors having rollers driven along rails by chains having pin means on which the rollers are mounted, each roller set comprising:
    a support roller rotatably loosely fitted over the pin means, the support roller having a larger diameter portion, with a rim for carrying conveyed articles, and having side faces;
    annular bosses of smaller diameter protecting axially beyond the side faces, the bosses having inner peripheral surfaces for frictionally engaging the pin means and having outer peripheral surfaces;
    a chain roller rotatably loosely fitter on each of the bosses, the chain rollers having inner peripheral surfaces for frictionally engaging the outer peripheral surfaces, of the bosses, having outer peripheral surfaces for engaging the rails and having side faces for frictionally engaging side faces of the support roller;
    one of the inner and outer peripheral surfaces of each chain roller being tapered to direct a component of force urging the chain rollers inwardly to enable frictional engagement between the respective side faces of the support roller and the chain rollers; and,
    the outer peripheral surface of each boss being shaped to conform to the inner peripheral surface of the chain rollers, whereby the frictional engagement between the chain and support rollers is substantially increased.

8. An improved roller set according to claim 7, wherein:
    the bosses of the support rollers are substantially cylindrical;
    the chain rollers are of conical form, the outer peripheral surfaces being tapered and the inner peripheral surfaces being substantially cylindrical, thereby defining annular end faces of larger and smaller diameter relative to one another; and, the larger diameter annular end faces being positioned for frictional engagement with the side faces of the support rollers.

9. An improved roller set according to claim 8, wherein the support rollers comprise annular grooves in the side faces for receiving the larger diameter annular end faces of the chain rollers, thereby enabling additional frictional engagement between portions of the outer peripheral surface of the chain rollers and the support roller.

10. An improved roller set according to claim 7, wherein the support rollers comprise annular grooves for receiving the side faces of the chain rollers, as well as portions of the outer peripheral surfaces of the chain rollers.

11. An improved roller set according to claim 7, wherein the inner peripheral surfaces of the support rollers and the outer peripheral surfaces of the chain rollers are substantially cylindrical.

12. An improved roller set according to claim 11, wherein each of the chain rollers has a conically shaped bore defining opposite annular end faces of different thickness relative to one another, the chain rollers being so disposed that the larger thickness and faces are positioned for frictional engagement with the side faces of the support rollers.

13. An acceleration accumulation chain conveyor, comprising:

rail means;

chain means having pin means for driving rollers along the rails;

support rollers rotatably loosely fitted over the pin means, each support roller having a larger diameter portion with a rim for engaging conveyed articles, having side faces and having annular bosses of smaller diameter projecting axially beyond the side faces, the bosses having inner peripheral surfaces for frictionally engaging the pin means and having outer peripheral surfaces; and, chain rollers rotatably loosely fitted on the bosses, the chain rollers having inner peripheral surfaces for frictionally engaging the outer peripheral surfaces of the bosses, having outer peripheral surfaces for engaging the rails and having side faces for frictionally engaging the side faces of the support rollers, one of the inner and outer peripheral surfaces of the chain rollers being tapered to direct a component of force urging the chain rollers inwardly to enable frictional engagement between the respective side faces of the support rollers and the chain rollers, and the outer peripheral surface of the boss being shaped to conform for the inner peripheral surface of the chain roller, whereby the frictional engagement between the chain and support rollers is substantially increased.

14. An acceleration accumulation chain conveyor according to claim 13, wherein:

the bosses of the support rollers are substantially cylindrical;

the chain rollers are of conical form, the outer peripheral surfaces being tapered and the inner peripheral surfaces being substantially cylindrical, thereby defining annular end faces of larger and smaller diameter relative to one another; and, the larger diameter annular end faces being positioned for frictional engagement with the side faces of the support rollers.

15. An acceleration accumulation chain conveyor according to claim 14, wherein the support rollers comprise annular grooves in the side faces for receiving the larger diameter annular end faces of the chain rollers, thereby enabling additional frictional engagement between portions of the outer peripheral surface of the chain rollers and the support roller.

16. An acceleration accumulation chain conveyor according to claim 13, wherein the support rollers comprise annular grooves for receiving the side faces of the chain rollers, as well as portions of the outer peripheral surfaces of the chain rollers.

17. An acceleration accumulation chain conveyor according to claim 13, wherein the inner peripheral surfaces of the support rollers and the outer peripheral surfaces of the chain rollers are substantially cylindrical.

18. An accumulation chain conveyor according to claim 17, wherein each of the chain rollers has a conically shaped bore defining opposite annular end faces of different thickness relative to one another, the chain rollers being so disposed that the larger thickness and faces are positioned for frictional engagement with the side faces of the support rollers.

* * * * *